US011868948B2

(12) United States Patent
Daley et al.

(10) Patent No.: US 11,868,948 B2
(45) Date of Patent: Jan. 9, 2024

(54) TRANSPORTATION SYSTEM

(71) Applicant: INTERNATIONAL BUSINESS MACHINES CORPORATION, Armonk, NY (US)

(72) Inventors: Stan Kevin Daley, Atlanta, GA (US); Craig M. Trim, Ventura, CA (US); Michael Bender, Rye Brook, NY (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 16/451,154

(22) Filed: Jun. 25, 2019

(65) Prior Publication Data

US 2020/0410436 A1 Dec. 31, 2020

(51) Int. Cl.
| | |
|---|---|
| *G06Q 10/0832* | (2023.01) |
| *G07C 5/08* | (2006.01) |
| *H04L 9/06* | (2006.01) |
| *A01M 31/00* | (2006.01) |
| *G06Q 50/30* | (2012.01) |
| *G06Q 50/28* | (2012.01) |
| *H04L 9/00* | (2022.01) |

(52) U.S. Cl.
CPC ....... *G06Q 10/0832* (2013.01); *A01M 31/002* (2013.01); *G07C 5/085* (2013.01); *H04L 9/0643* (2013.01); *G06Q 50/28* (2013.01); *G06Q 50/30* (2013.01); *H04L 9/50* (2022.05)

(58) Field of Classification Search
CPC .............. G06Q 10/0832; G06Q 50/28
See application file for complete search history.

(56) References Cited

U.S. PATENT DOCUMENTS

| | | |
|---|---|---|
| 10,176,481 B2 | 1/2019 | Aljawhari |
| 2005/0248454 A1* | 11/2005 | Hanson ............ H04Q 9/00 340/539.22 |
| 2006/0062818 A1 | 3/2006 | Walker et al. |
| 2006/0150470 A1 | 7/2006 | Ronnau |
| 2014/0058881 A1* | 2/2014 | Rosenbaum ........ G06Q 50/02 705/26.7 |
| 2016/0379165 A1* | 12/2016 | Moakley ........... G06Q 10/0833 705/333 |

(Continued)

FOREIGN PATENT DOCUMENTS

CN 104798766 A 7/2015

OTHER PUBLICATIONS

Poland, T.M., Rassati, D. Improved biosecurity surveillance of non-native forest insects: a review of current methods. J Pest Sci 92, 37-49 (2019). https://doi.org/10.1007/s10340-018-1004-y (Year: 2019).*

(Continued)

*Primary Examiner* — Resha Desai
*Assistant Examiner* — Carter P Brockman
(74) *Attorney, Agent, or Firm* — Schmeiser, Olsen & Watts, LLP; Nicholas Welling

(57) ABSTRACT

A method, system and computer program product includes identifying a presence of a problem with one or more items in transport using cognitive analytics and information received from at least one sensing device. In response to the identifying, storing an identification of the presence of the problem in a block chain ledger by a secure and validated feed having an indexed encryption identifying the sensing device, and recommending a remediation action to fix the problem with the one or more items.

20 Claims, 7 Drawing Sheets

(56) References Cited

U.S. PATENT DOCUMENTS

| | | | |
|---|---|---|---|
| 2017/0156304 A1 | 6/2017 | Hori et al. | |
| 2017/0174731 A1 | 6/2017 | Kennedy et al. | |
| 2018/0096175 A1* | 4/2018 | Schmeling | B29C 64/10 |
| 2018/0130050 A1* | 5/2018 | Taylor | G06Q 20/3829 |
| 2018/0225622 A1* | 8/2018 | Factor | G06F 16/29 |
| 2018/0285810 A1 | 10/2018 | Ramachandran et al. | |
| 2018/0374039 A1 | 12/2018 | Walden et al. | |
| 2019/0188638 A1* | 6/2019 | DeSimone | G06Q 10/0833 |
| 2020/0034876 A1* | 1/2020 | Soundararajan | H04L 9/0637 |
| 2020/0072766 A1* | 3/2020 | Reimer | A23B 9/00 |
| 2022/0053307 A1* | 2/2022 | Schadow | G06Q 10/20 |

OTHER PUBLICATIONS ip.com No. IPCOM000253387D, Authors: Anonymous, Date: Mar. 27, 2018, Automated Methods for Publicly Verifiable Monitoring and Trustworthy Accounting of Sustainable Farming, 8 pages.

Mell, Peter et al.; "The NIST Definition of Cloud Computing;" National Institute of Standards and Technology; Special Publication 800-145; Sep. 2011; 7 pages.

Matthew Stock, Pests and pathogens cost global agriculture $540 billion a year, Jun. 2, 2017, https://geneticliteracyproject.org/2017/06/02/pests-pathogens-cost-global-agriculture-540-billion-year/, 2 pages.

David Pogue, 8 Recognition Apps Work Almost Like Magic, Scientific American, Jul. 1, 2013, https://www.scientificamerican.com/article/pogue-8-recognition-apps-work-almost-like-magic/, 3 pages.

Emily Price, Cicada Hunt Is Like Shazam for Insect Sounds, Aug. 30, 2013, http://mashable.com/2013/08/30/cicada-hunt-app/#OdDFxV0WfaqZ, 3 pages.

* cited by examiner

TRANSPORTATION SYSTEM

TECHNICAL FIELD

The present invention relates to transportation. More specifically, the invention relates to systems and methods for identifying problems, remedying problems and/or validating problem-free systems in transportation.

BACKGROUND

Transportation systems are complex and often require one or more supply chairs points for items to arrive at their destination. Various issues can arise in any supply chain. One example of transportation systems in which problems arise is agricultural transportation. Pests and pathogens cost global agriculture hundreds of billions of dollars per year. While attention has been paid to controlling the problem at farms, the dangers still exist that a small amount of pests grows into a bigger problem during transportation. This can impact companies and communities further down the supply chain. This can be an international and/or interstate issue, where national and/or state customs and agricultural control bodies now look to achieve guaranteed safety when agricultural products are transported across borders.

SUMMARY

An embodiment of the present invention relates to a method, and associated computer system and computer program product. One or more processors of a computer system identify a presence of a problem with one or more items in transport using cognitive analytics and information received from at least one sensing device. In response to the identifying, the one or more processors of the computer system store an identification of the presence of the problem in a block chain ledger by a secure and validated feed having an indexed encryption identifying the sensing device. The one or more processors of the computer system recommend a remediation action to fix the problem with the one or more items.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention seeks to utilize sensing technology, blockchain security, and cognitive analytics to check and validate products transported as part of a supply chain, such as an agricultural supply chain in particular, are free of problems such as pest infestations. Based on the systems and methods disclosed herein, a problem-free determination may be made that cannot be repudiated by any party interested in the supply chain. The present invention may be dependent on technological structure and specific practical applications including sensing devices such as cameras, microphones, moisture sensors, and the like, to determine if a problem such as pests is present. The present invention seeks to use cognitive analytics to take the sensed information and determine remediation recommendations, along with validation and auditing of past and present remediation recommendations. The present invention seeks to improve the supply chain by creating a system that indisputably tracks problems, or the lack thereof, through the supply chain.

Figure 1:
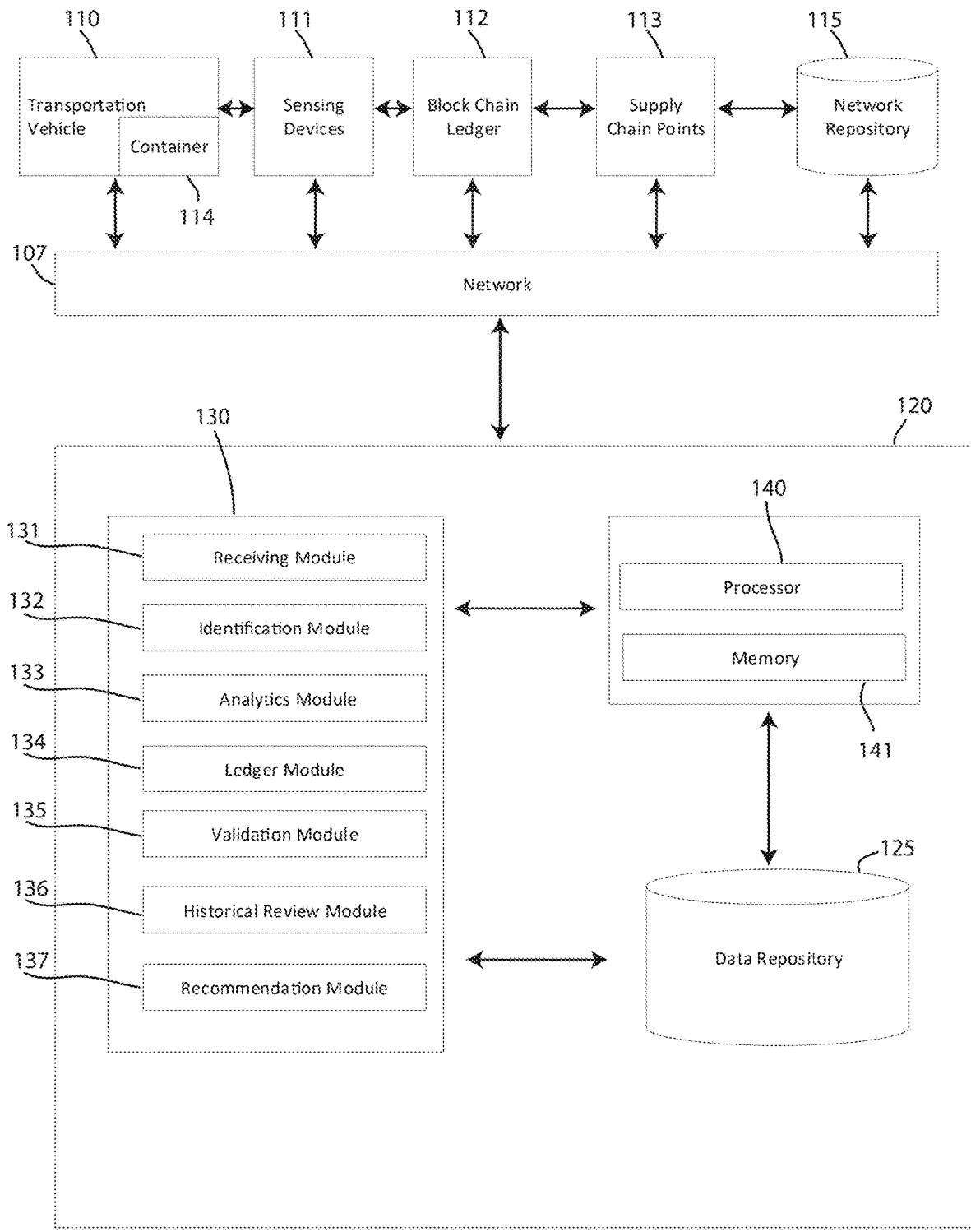
FIG. 1 depicts a block diagram of a transportation system, in accordance with embodiments of the present invention.

Referring to the drawings, FIG. 1 depicts a block diagram of a transportation system 100, in accordance with embodiments of the present invention. Embodiments of the system of transportation system 100 may be configured to identify supply chain points where a product is introduced, analyze the historical status of a vehicle transporting the product to check for a prior problem such as a pest infestation. If such a problem exists, the transportation system 100 may be configured to validate remediation and re-checking of the vehicle. The transportation system 100 may be configured to identify transportation of the product to and from supply chain points. The transportation system 100 may further be configured to provide secure identification of the vehicle or vehicles used for transportation of the product and communicate with a central computer system. The transportation system 100 may further be configured to provide secure data through communication structure to send information about potential problems to a secure system at pre-identified times. Still further, the transportation system 100 may be configured to identify actions based on the existence of a problem, such as the existence of pests, and the risks associated with those problems as it relates specifically to the type of product being transported. The transportation system 100 may utilize a secure ledger, such as a blockchain, to store data populated by secure interfaces. The transportation system 100 may be configured to ensure that nothing gets transported from a first supply point to a second supply point that could impact the supply chain that the second supply point provides.

The transportation system 100 may be configured to perform methods of identifying supply chain points for product transportation, methods to analyze previous problems with transportation vehicles, methods to identify vehicles and products being transported, methods to determine the risk associated with a delivery and select locations to test delivery, methods to communicate safety status relating to a transport in a secure process, methods to persist the safety data for the delivery vehicles and product, and methods to determine remediation required after pests or other problems are found in the delivery process.

The transportation system 100 is shown including a transportation vehicle 110 having at least one container 114, sensing devices 111, a block chain ledger 112, supply chain points 113, and a network repository 115 connected over a network 107 to a computer system 120. Each of the transportation vehicle 110, the container 114, the sensing devices 111, the block chain ledger 112, the supply chain points 113, and the network repository 115 may each represent a plurality or a single one of the given element 110, 111, 112, 113, 114, 115. Some or all of the transportation vehicle 110, the container 114, the sensing devices 111, the block chain ledger 112, the supply chain points 113, and the network repository 115 may be interconnected to others of these devices. While FIG. 1 shows the transportation vehicle 110, the container 114, the sensing devices 111, the block chain ledger 112, the supply chain points 113, and the network repository 115 directly connected to adjacent elements 110, 111, 112, 113, 114, 115, any interconnection (e.g. non-adjacent) of elements 110, 111, 112, 113, 114, 115 is contemplated. Further, while each of the elements 110, 111, 112, 113, 114, 115 are shown as separate features of the transportation system 100, in some embodiments one or more of the elements 110, 111, 112, 113, 114, 115 may be combined or contain overlapping structure and functionality (e.g. the web site 113 may include functionality or features attributed in the present description to the social media platform 112).

In the embodiment shown, the transportation vehicle 110 is any type of supply chain transportation vehicle, such as a truck, tractor trailer, train or freight car, airplane, drones, autonomous vehicles or the like. The transportation vehicle is shown equipped with at least one container 114. The container 114 may represent the location in the vehicle in which the items are being transported, such as a semi-trailer, a freight car, a cargo bay of an airplane, or the like. In other embodiments, the container 114 may be one or more physical containers within which the items are contained that are then loaded into the cargo area of the particular transportation vehicle 110 that is being utilized in the supply chain. It should be understood that the transportation system 100 may include many transportation vehicles 110 and containers 114. Further, the transportation system 100 may be configured to transport various different items through the supply chain and may have different transportation vehicles 110 and/or containers 114 for each of the particular items being transported.

The transportation system 100 further includes sensing devices 111. The sensing devices 111 may be any internet of things (IoT) devices. By way of example, the sensing devices 111 a microphone or camera configured to sense sound, picture and/or video. The sensing devices may be user-operated devices, in some embodiments. In other embodiments, the sensing devices 111 may be automatic sensing devices equipped in the various elements 110, 113, 114 of the system. In some embodiments, the transportation system 100 may allow a user to opt in or opt out of one or more sensing functions or the use of one or more of the sensing devices 111 within the system. Further, embodiments contemplate that the transportation system 100 may provide notification when data collection may occur.

In some embodiments, the sensing devices 111 may include moisture detectors, heat detectors (e.g. thermometers), location detectors (GPS, Geofencing, etc.) or the like. The sensing devices 111 may be single use sensing devices and/or continual or multi use sensing devices. The sensing devices 111 may be configured to communicate sensed information through the network 107 to the computer system 120. One or more sensing devices 111 may be provided for within the transportation vehicle 110, such as in the cargo bay or the container 114 of the transportation vehicle 110. One or more sensing devices 111 may be placed within separate containers 114 within which the items being transported are carried. The sensing devices 111 may further be located in various supply chain points 113, to detect, for example, the location of transportation vehicles 110. The sensing devices 111 may comprise GPS location detectors equipped in the transportation vehicle 110, which may communicate timely location information of each of the transportation vehicles 110 of the transportation system 100 to the computer system 120. The sensing devices 111 may be configured to scan the transportation vehicles 110 to detect whether or not a pest infestation is found within the containers 114 therein.

The transportation system 100 further includes one or more block chain ledgers 112. For example, the transportation system 100 may include a first block chain ledger related to the particular product, item or goods being transported through the supply chain. The transportation system 100 may include another block chain ledger related to each of the particular transportation vehicles 110 in the transportation system 100. The transportation system 100 may still further include a block chain ledger related to each of the containers 114 in the transportation system 100. Still further, the transportation system 100 may include a block chain ledger related to each of the supply chain check points. The block chain ledgers 112 may be configured to provide a secure date related to the sensed states of each of the respective elements 110, 113, 114 to which they pertain. The block chain ledgers 112 may ensure that the information related to the supply chain, and the particular elements 110, 113, 114 thereof, contained and tracked by the computer system 120 cannot be repudiated, tampered with, or the like.

The transportation system still further includes a plurality of supply chain points 113. In the case that the supply chain is an agricultural supply chain, the supply chain points 113 may include, for example, the farm where the agricultural items derives, a processing plant that cleans, or otherwise processes the item, a storage location for storing processed items, and a retail location for selling the items. Each of these various supply chain points 113 may be located in different physical locations, requiring transportation in the various transportation vehicles 110 within the transportation system 100 to move through the supply chain points 113.

The network repository 115 is a data collection area on the network 107 which may back up and save all the data transmitted back and forth between the nodes of the network 107. For example, the network repository 115 may be a data center saving and cataloging data sent between the nodes of the network 107. The network repository 115 uses this data to generate databases related to the information received. In some embodiments, a data collection center housing the network repository 115 may include an analytic module capable of analyzing each piece of data being stored by the network repository 115. Further, the computer system 120 may be integrated with or may be a component of the data collection center housing the network repository 115. In some alternative embodiments, the network repository 115 may be a local repository that is connected to the computer system 120.

The network 107 is any group of two or more computer systems linked together. The network 107 may represent, for example, the internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture. The computer system 120 is shown connected to each of the transportation vehicle 110, the container 114, the sensing devices 111, the block chain ledger 112, the supply chain points 113, and the network repository 115 via the network 107.

Embodiments of the computer system 120 is shown including a module structure 130 that includes a receiving module 131, an identification module 132, an analytics module 133, a ledger module 134, a validation module 135, a historical review module 136, and a recommendation module 137. A "module" herein refers to any hardware-based module, software-based module, or combination thereof. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving module 131 include one or more components of hardware and/or software program code for obtaining, retrieving, collecting, or otherwise receiving information from the transportation vehicle 110, the container 114, the sensing devices 111, the block chain ledger 112, the supply chain points 113, and the network repository 115. In an exemplary embodiment, the receiving module 131 is configured to receive sensed information related to the location of a transportation vehicle 110 and/or container 114, the status of a transportation vehicle 110 and/or container 114, based on the sensing devices 111, or various other manually input information required. The receiving module 131 may be configured to receive information from applications which may be interfaced with the computer system 120 that are operating on various user devices and/or sensing devices 111 or on systems of the transportation vehicle. The information provided from these sources to the receiving module 131 may be in the form of text, images, videos, or application specific data that may be capable of analysis by the computer system 120. The receiving module 131 provides information received by the computer system 120 to the other modules of the module structure 130, to the data repository 125 of the computer system 120 and/or to a block chain ledger.

Referring still to FIG. 1, embodiments of the computer system 120 shown further includes an identification module 132. Embodiments of the identification module 132 include one or more components of hardware and/or software program code configured for identifying a presence of a problem with one or more items in transport using cognitive analytics and information received from at least one sensing device. The identifying module 132 may further be configured to identify one or more points in a supply chain for transporting the one or more items that need to be tracked. The identifying module 132 may still further be configured to identify a container used to transport the one or more items. The identifying module 132 may be configured to work with the analytics module 133 in reviewing and analyzing the information received in order to identify when problems in the supply chain are present.

Referring still to FIG. 1, embodiments of the computer system 120 shown further includes an analytics module 133. Embodiments of the analytics module 133 include one or more components of hardware and/or software program code configured for analyzing the information received and/or processed by the receiving module 131. The analytics module 133 may be a cognitive analytics engine configured to provide the analytical processing required to perform the various analysis made by the computer system 120. The cognitive analytics engine may be configured to notice patterns and draw conclusions based on detected patterns. The analytics module 133 may be programmed with various algorithms which may allow the analytics module 133 to draw conclusions based on the information provided. For example, the analytics module 133 may include algorithms that if various conditions are met, it is very likely that a particular pest infestation is present. The analytics module 133 may further include algorithms to determine if a remediation is complete, based on factors such as the amount of time that has elapsed since the remediation began. The analytics module 133 may be configured to update algorithms based on newly received information and feedback.

Referring still to FIG. 1, the computer system 120 further includes a ledger module 134. Embodiments of the ledger module 134 include one or more components of hardware and/or software program code configured for maintaining a secure ledger, such as a blockchain ledger, related to the supply chain. The ledger module 134 may be configured to create a secure ledger related to the status, both present and historical, of various elements of the system. For example, the ledger module 134 may be configured to create a block chain ledger for each of the transportation vehicles 110, the containers 114, the supply chain points 113, or the particular items being transported by the supply chain system. The ledger module 134 may be configured to create and/or maintain a secure ledger that cannot be refuted by any party interested in the supply chairs. Once data is entered into the ledger module 134, the ledger module 134 may ensure that the data cannot be manipulated, hacked, or otherwise altered.

Referring still to FIG. 1, the computer system 120 further includes a validation module 135. Embodiments of the validation module 135 include one or more components of hardware and/or software program code configured for validating a recommended remediation action using cognitive analysis prior to transporting the one or more items. The validation module 135 may be configured to validate the safety status of various transportation vehicles 110 and/or containers 114 in the system. The validation module 135 may work with the cognitive analytics module 134 and the historical review module 136 to determine whether a remediation is validated or whether the safety of a transportation vehicle 110 and/or container 114 is validated.

Referring still to FIG. 1, the computer system 120 further includes a historical review module 136. Embodiments of the historical review module 136 include one or more components of hardware and/or software program code configured for auditing a historical status of the plurality of vehicles used for transporting the one or more items checking for prior problems. The historical review module 136 may be configured to monitor and determine the time period during which a recommended remediation has been ongoing for, in order to prevent a vehicle or container from re-entering the supply system until an appropriate time has passed to allow for a remediation to properly complete. The historical review module 136 may further be configured to account for a historical review of each element in the supply chain that is being monitored by the computer system 120. For example, the historical review module 136 may provide a historical review of each transportation vehicle, container, item being transported, or supply chain point.

Referring still to FIG. 1, the computer system 120 further includes a recommendation module 137. Embodiments of the recommendation module 137 include one or more components of hardware and/or software program code configured for providing remediation recommendations to user devices in the supply chain related to the remediating problems in the supply chain. Thus, the computer system 120 may be in communication with user devices of vehicle drivers, supply chain point managers, or general overseers of the supply chain to provide notifications and recommendations related to the supply chain in conformity with the various embodiments of the present invention described herein.

As described above, the computer system 120 includes one or more data repositories 125. The data repositories 125 may be any data repository configured to store data or information received by the computer system 120. The data repositories may further include additional block chain or otherwise secured data ledgers. The data repository 125 may include one or more data centers which may be either remote or local. The data repository 125 may be any form of data repository to store the data for analysis by the module structure 130 of the computer system 120.

Referring still to FIG. 1, embodiments of the computer system 120 may be equipped with a memory device 142 which may store information being used by the module structure 130 of the computer system 120. The computer system 120 may further be equipped with a processor 141 for implementing the tasks associated with the system of cognitive analysis of temporal obstructions in a cellular network 100 and perform processing associated with the functionality of the module structure 130.

Figure 2:
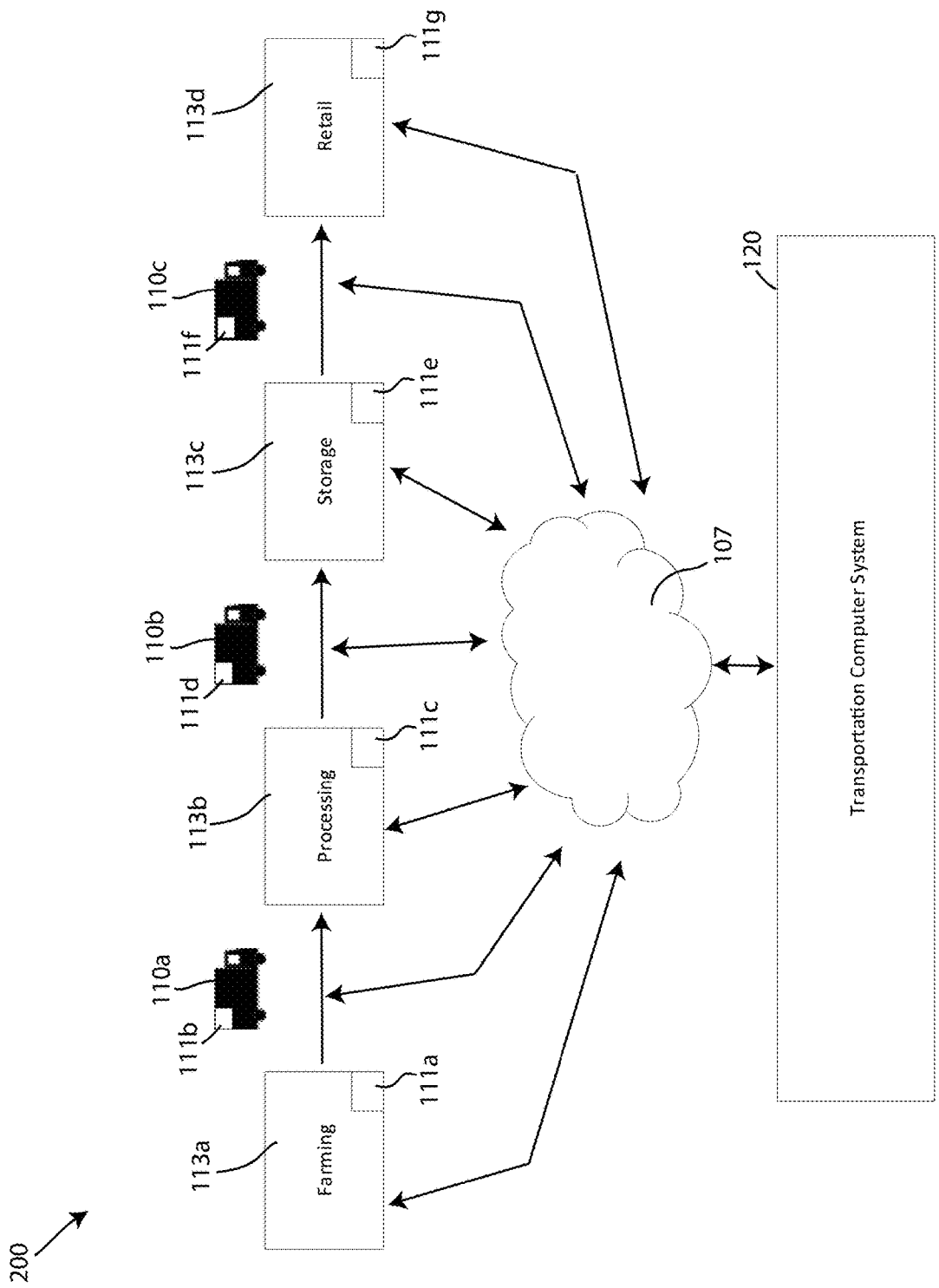
FIG. 2 depicts an embodiment of the transportation system of FIG. 1, in accordance with embodiments of the present invention.

FIG. 2 depicts an embodiment 200 of the transportation system of FIG. 1, in accordance with embodiments of the present invention. The embodiment 200 includes various supply chain points including a farming supply chain point 113a, a processing supply chain point 113b, a storage supply chain point 113c, and a retail supply chain point 113d. Further, various transportation vehicles are shown, such as a first transportation vehicle 110a configured to provide transportation of items between the farming supply chain point 113a and the processing supply chain point 113b, a second transportation vehicle 110b configured to provide transportation of items between the processing supply chain point 113b and the storage supply chain point 113c, and a third transportation vehicle 110c configured to provide transportation of items between the storage supply chain point 113c and the retail supply chain point 113d. Each of the transportation vehicles 110a, 110b, 110c and the supply chain points 113a, 113b, 113c, 113d each are shown including various sets of sensing devices 111a, 111b, 111c, 111d, 111e, 111f, 111g. These sensing devices 111a, 111b, 111c, 111d, 111e, 111f, 111g are configured to communicate over the network 107 to the computer system 120. It should be understood that this is a simple exemplary supply chain system, and that complex supply chain systems configured to transport multiple types of goods from various farms, processors, storage facilities, and retail locations using hundreds or thousands of various different transportation vehicles are contemplated.

There are various examples of the present transportation system 100 being used to identify problems, analyze the status, validate, make recommendations and generally monitor, verify and remedy a supply chain. For example, in one embodiment, a truckload of fruit is being transported from a farm to a packer facility in a closed truck. The truck is equipped with cameras and microphones that have a system which cognitively analyzes the truck and determines that the truck contains pests that could cause harm to all the food in the packer. The truckload is identified in a blockchain ledger based on a unique identification of the truck and re-routed away from the packer and to a location where the crop can be used in another manner.

In another embodiment, a truck with empty peach baskets is sent to the farm in an open truck. A geofence sensor requires the driver to use handheld microphones and/or cameras to check for pests when the driver arrives at the farm for pickup. When a small number of pests are found by the driver, the sensed information may be provided to the computer system 120 whereby the computer system 120 may be configured to direct the driver to send the compromised baskets to be treated and then re-checked before use of the baskets continues.

In still another embodiment, a load of vegetables is sent to the packer from the farm. The computer system 120 utilizes the data and information received e sensing devices 111 to determine that there are no problems and verification of the contents of the truck are sent to a block chain ledger for persistent storage via the secure communications of the computer system 120 in order to prove the safety of the load of vegetables.

In still another embodiment, a train has a single car that has been detected by the computer system 120 to be infested by a pest. The computer system 120 may be configured to determine that the single car should be removed from the train depot. The computer system 120 may be configured to recommend removing the contents of the single car and destroying the contents in a flash freeze manner to ensure that the pests are destroyed.

Figure 3:
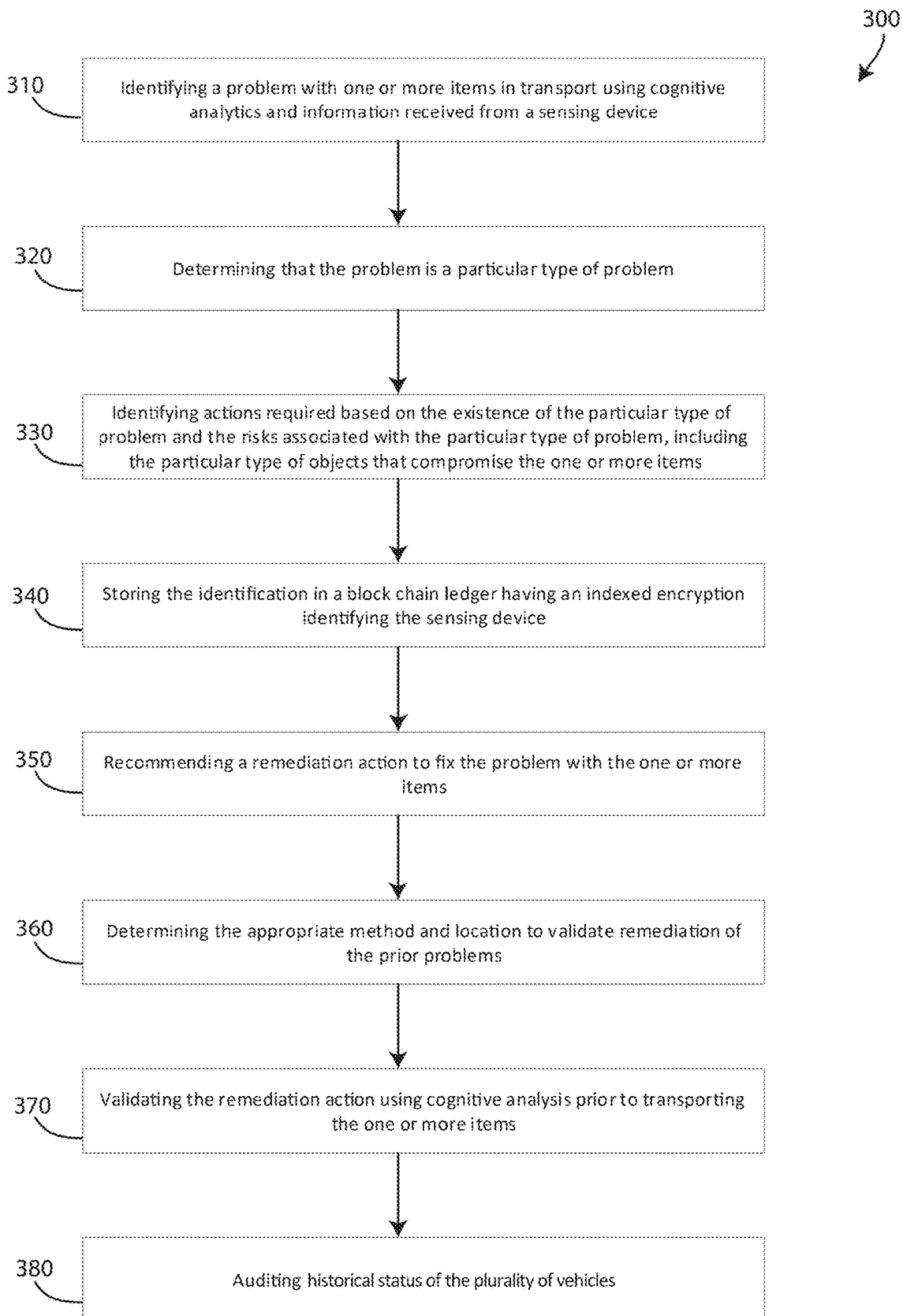
FIG. 3 depicts a flow chart of a method of transporting items, in accordance with embodiments of the present invention.

FIG. 3 depicts a flow chart of a method 300 of transporting items, in accordance with embodiments of the present invention. The method 300 includes a step 310 of identifying, by one or more processors of a computer system such as the processor 140 of the computer system 120, a presence of a problem with one or more items in transport using cognitive analytics and information received from at least one sensing device such as the sensing devices 111. This identifying step 310 may include, for example, identifying, by the one or more processors of the computer system, one or more points in a supply chain, such as the supply chain points 113, for transporting the one or more items that need to be tracked. The identifying step 310 may further include identifying, by the one or more processors of the computer system, a container, such as the container 114, used to transport the one or more items, and scanning the one or more items in the container at each point of the one or more points in the supply chain.

The method 300 may include a next step 320 of determining, by the one or more processors of the computer system, that the problem is a particular type of problem. For example, if the problem is a pest infestation, the method 300 may include determining that the pest infestation is a particular type of pest infestation. The method 300 may then include a step 330 of identifying, by the one or more processors of the computer system, actions required based on the existence of the particular type of problem and the risks associated with the particular type of problem, including the particular type of items or objects that comprise the one or more items. actions required based on the existence of the pest infestation and the risks associated with the particular type of pest infestation and the particular type of objects that comprise the one or more objects. For example, in the event that the problem is pests, the method 300 may include identifying, by the one or more processors of the computer system, actions required based on the existence of the pest infestation and the risks associated with the particular type of pest infestation and the particular type of items that comprise the one or more items.

The method 300 includes a next step 340 of storing, by the one or more processors of the computer system, an identification of the presence of the problem in a block chain ledger, such as the block chain ledger 112, by a secure and validated feed having an indexed encryption identifying the sensing device. In some embodiments, the step 340 may be in response to the identifying the problem. The method 300 may include a further step 350 of recommending, by the one or more processors of the computer system, a remediation action to fix the problem with the one or more items. In embodiments of the method 300, the container includes the at least one sensing device, and the method 300 further includes registering each of the container, the one or more items, and the at least one sensing device in the block chain ledger.

The method 300 may still further include a step 360 of determining, by the one or more processors of the computer system, the appropriate method and location to validate remediation of the prior problems. The method 300 may also include a step 370 of validating, by the one or more processors of the computer system, the recommended remediation action using cognitive analysis prior to transporting the one or more items. The method 300 may further include a step 380 of auditing, by the one or more processors of the computer system, a historical status of the plurality of vehicles used for transporting the one or more items checking for prior problems. For example, this may include validating remediation of the prior problems and rechecking one or more of the plurality of vehicles. The step 380 may further include a step of providing secure identification of a plurality of vehicles used for transporting the one or more items to the one or more processors of the computer system.

Figure 4:
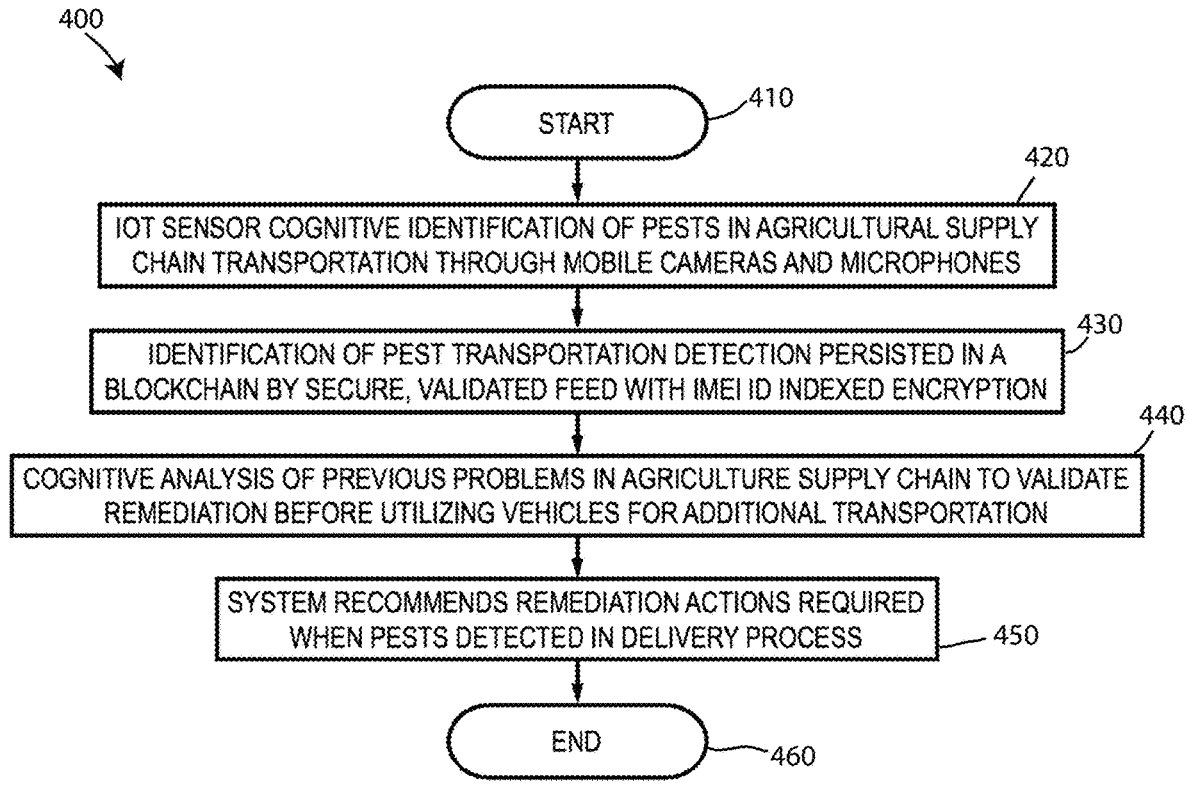
FIG. 4 depicts a flow chart of a method of transporting items in an agricultural supply chain, in accordance with embodiments of the present invention.

FIG. 4 depicts a flow chart of a method 400 of transporting items in an agricultural supply chain, in accordance with embodiments of the present invention. The method 400 may be one specific implementation of the transportation system 100 and method of transporting items 300 described herein above. The method 400 includes a start step 410 followed by a step 420 of an internee of things sensor system, such as the transportation system 100, cognitively identifying pests in an agricultural supply chain transportation through mobile cameras and microphones. The method 400 includes a step 430 of identification of pest transportation detection persisted or otherwise tracked and maintained in a blockchain by a secure, validated feed with an international mobile equipment identity (IMEI) indexed encryption. The method 400 includes another step 440 of cognitively analyzing previous problems in the agricultural supply chain to validate remediation before utilizing vehicles for additional transportation. Still further, the method 400 includes a step 450 of recommending remediation actions required when pests are detected in the supply chain and/or delivery process.

Various methods are contemplated. In various embodiments, methods of identifying supply chain points for product transportation are contemplated. Methods may include identifying where products, packaging or transportation vehicles are introduced in the supply chain. In some embodiments, request for movement may be made of product registered in the system when product is transported to and from various locations in the supply chain points. Transportation vehicles may be registered in the system and a block chain ledger may be created for each transportation vehicle.

In various embodiments, methods of analyzing previous problems with transportation vehicles are contemplated. For example, methods may be used to check if a vehicle that is being used to move product or packaging in the agricultural supply chain has had previous problems, and if so, validating that the problem has been rectified. Block chain ledger(s) may be employed and checked to see if previous problems were identified for a particular transportation vehicle. If problems are noted, the system may check to see if remediated occurred, and whether that remediation occurred with sufficient time between remediation and delivery to account for any pests. If insufficient time is detected for remediation, the vehicle may not be permitted or assigned to be used in the supply chain. This may be particularly useful in the case that remediation techniques require a known and predictable time frame to sufficiently remedy an infestation.

In various embodiments, methods of identifying vehicles and product being transported are contemplated. Methods may be used to identify the vehicles and product being transported and to allow for documentation that cannot be repudiated on the safety of the delivery. A vehicle may be registered in a first block chain ledger, which may include information related to the vehicle's type (i.e open truck, closed truck, shipping contain system may monitor and assign types for each type of new vehicle entered into the system. The product being transported may be registered in a second block chain ledger.

In various embodiments, methods of determining the risk associated with a delivery and selecting locations accordingly to test a delivery are contemplated. For example, methods may determine the locations at which to check for pests during transport between two supply chain points to minimize if problems exist. Methods may check supplied distances from end points to check a vehicle for pests based on requirements for end point and for product mix. Methods may determine a safe location to check, if not in real time, based on registered locations. Methods may use registered IoT devices to capture audio and video with which to analyze pests. Methods complete cognitive analysis of audio and video to identify any pests present and the level of infestation, if found. Methods further include determining if any pests pose a risk to the product being transported or any other product at the endpoint.

Methods contemplated further may include communicating safety statuses relating to a transport in a secure process. Methods may communicate the safety checks from the previously identified locations to ensure that it may be secure and validated before being loaded into the system. Methods may provide updates to both blockchain ledgers, which may include scans about the product and vehicle. Hashing, encryption, and secured login may be provided based on registered IMEI id and GPS-determined location of a vehicle, which may be validated prior to initiating communications.

Still further, various embodiments include methods of persisting the safety data for the delivery vehicles and product so that external interested parties can validate safety. These safety results may be stored in one or more blockchain ledgers.

Still further, various embodiments include determining remediation required after pests are found in the delivery process and making recommendations. Methods may include undertaking the steps required after pests have been found, where the actions for the product and transportation vehicles need to be executed and validated. This may include the computer system s referencing for product type, level of infestation, end point requirements and the like. Methods contemplate the computer system recommending refusal of delivery, refusal to allow on the property, sending a vehicle to another location for a different purpose, chemical and environmental treatment of a pest infestation, and tracking the time required after a recommended remediation begins for allowing a vehicle back into service.

Figure 5:
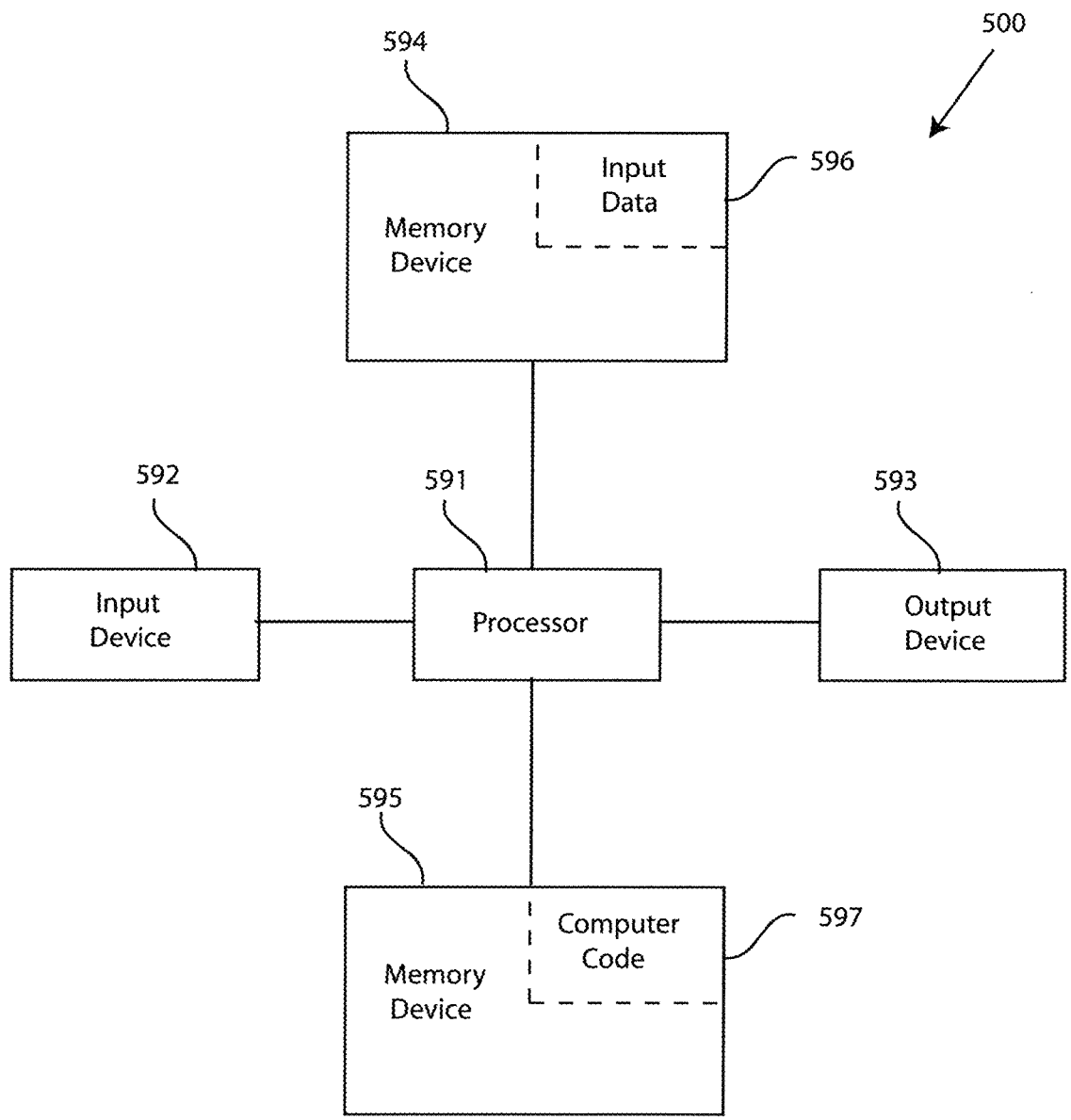
FIG. 5 depicts a block diagram of a computer system of the transportation system of FIG. 1, capable of implementing methods for transporting items in FIGS. 3-4, in accordance with embodiments of the present invention.

FIG. 5 illustrates a block diagram of a computer system that may representative of any computer or computer system within the transportation system 100 of FIG. 1, capable of implementing methods of transporting items of FIGS. 3-4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591, The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method of transporting items, in the manner prescribed by the embodiments of FIGS. 3-4 using the transportation system 100 of FIG. 1, wherein the instructions of the computer code 597 may be executed by processor 591 via memory device 595. The computer code 597 may include software or program instructions that may implement one or more algorithms for implementing the methods of transporting items, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computes usable storage medium (or said program storage device).

Memory devices 594, 595 include any known computer readable storage medium, including those described in detail below. In one embodiment, cache memory elements of memory devices 594, 595 may provide temporary storage of at least some program code computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN), Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as computer code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive a CD-ROM drive which receives a CD-ROM disk). In other embodiments, the data storage unit may include a knowledge base or data repository 5 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods of transporting items. Thus, an embodiment of the present invention discloses a process for supporting computer infrastructure, where the process includes providing at least one support service for at least one of integrating, hosting, maintaining and deploying computer-readable code (e.g., computer code 597) in a computer system (e.g., computer system 500) including one or more processor(s) 591, wherein the processor(s) carry out instructions contained in the computer code 597 causing the computer system to provide a transportation system. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of transporting items. Thus, the present invention discloses a process for supporting, deploying and/or integrating computer infrastructure, integrating, hosting, maintaining, and deploying computer-readable code into the computer system

500, wherein the code in combination with the computer system 500 is capable of performing a method of transporting items.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
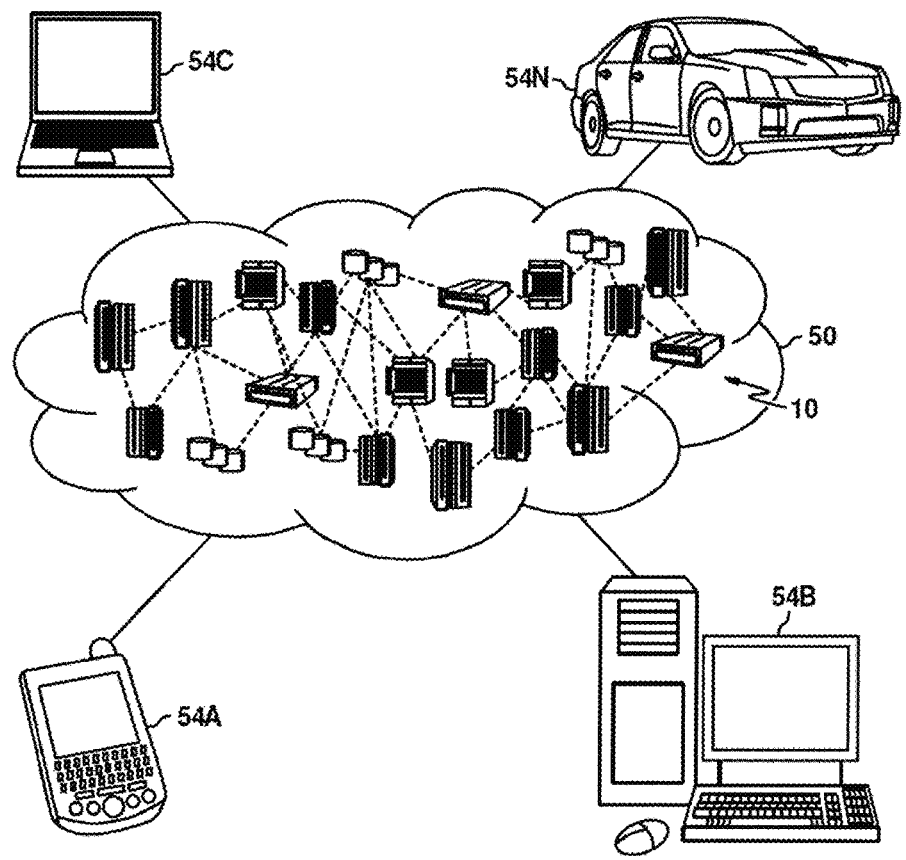
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
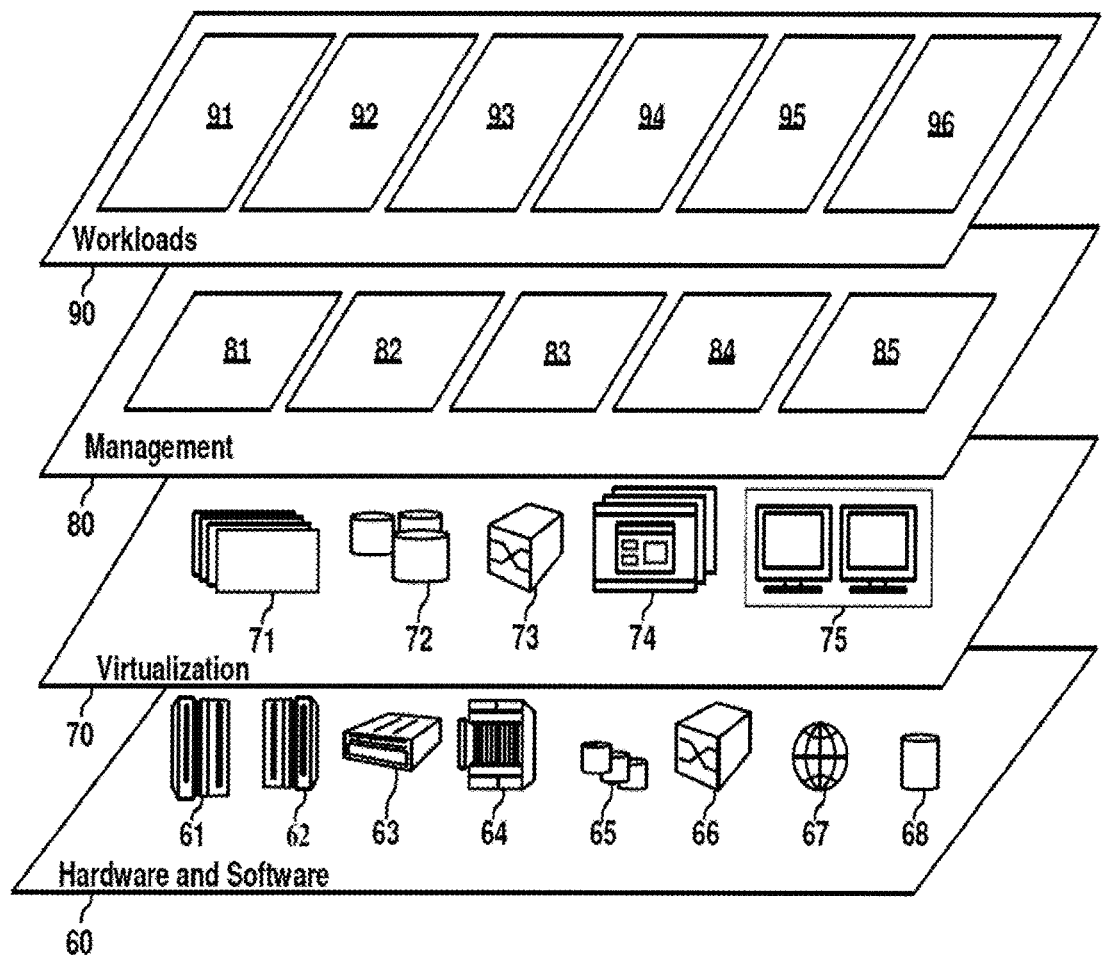
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to transportation of items 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

identifying, by one or more processors of a computer system, a presence of a pest infestation problem with one or more items in transport using cognitive analytics to notice patterns and draw conclusions based on detected patterns and using information received from at least one sensing device to determine that one or more conditions are met which indicate a particular pest infestation is likely to be present, wherein the identifying the presence of the pest infestation problem with one or more items in transport using cognitive analytics and information received from the at least one sensing device further comprises:

identifying, by the one or more processors of the computer system, one or more points in a supply chain for transporting the one or more items that need to be tracked;

identifying, by the one or more processors of the computer system, a container used to transport the one or more items; and scanning, by at least one sensing device, the container at the one or more points in the supply chain to detect whether a pest infestation is found within the containers;

in response to the identifying, storing, by the one or more processors of the computer system, an identification of the presence of the pest infestation problem in a block chain ledger by a secure and validated feed having an indexed encryption identifying the sensing device; and recommending, by the one or more processors of the computer system, a remediation action to fix the pest infestation problem with the one or more items.

2. The method of claim 1, further comprising:

validating, by the one or more processors of the computer system, the recommended remediation action using cognitive analysis prior to transporting the one or more items.

3. The method of claim 1, wherein the identifying the presence of the pest infestation problem with one or more items in transport using cognitive analytics and information received from the at least one sensing device further comprises:

using a handheld or mobile microphone and/or camera to check for pests in the container during pickup;

receiving, by the one or more processors of the computer system, audio or video captured by the handheld or mobile microphone and/or camera;

analyzing, by the one or more processors of the computer system, the audio or video to identify pests present and a level of infestation within the container.

4. The method of claim 3, wherein the container includes the at least one sensing device, the method further including registering each of the container, the one or more items, and the at least one sensing device in the block chain ledger.

5. The method of claim 1, further comprising:

providing secure identification of a plurality of vehicles used for transporting the one or more items to the one or more processors of the computer system; and auditing, by the one or more processors of the computer system, a historical status of the plurality of vehicles used for transporting the one or more items checking for prior problems; and at least one of:

validating remediation of the prior problems; and rechecking one or more of the plurality of vehicles.

6. The method of claim 5, further comprising:
determining, by the one or more processors of the computer system, the appropriate method and location to validate remediation of the prior problems.

7. The method of claim 1, further comprising:
determining, by the one or more processors of the computer system, that the pest infestation is a particular type of pest infestation;
identifying, by the one or more processors of the computer system, actions required based on the existence of the pest infestation and the risks associated with the particular type of pest infestation and the particular type of items that comprise the one or more items.

8. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method, the method comprising:
identifying, by the one or more processors of the computer system, a presence of a pest infestation problem with one or more items in transport using cognitive analytics to notice patterns and draw conclusions based on detected patterns and using information received from at least one sensing device to determine that one or more conditions are met which indicate a particular pest infestation is likely to be present, wherein the identifying the presence of the pest infestation problem with one or more items in transport using cognitive analytics and information received from the at least one sensing device further comprises:
identifying, by the one or more processors of the computer system, one or more points in a supply chain for transporting the one or more items that need to be tracked;
identifying, by the one or more processors of the computer system, a container used to transport the one or more items; and
scanning, by at least one sensing device, the container at the one or more points in the supply chain to detect whether a pest infestation is found within the containers;
in response to the identifying, storing, by the one or more processors of the computer system, an identification of the presence of the pest infestation problem in a block chain ledger by a secure and validated feed having an indexed encryption identifying the sensing device; and
recommending, by the one or more processors of the computer system, a remediation action to fix the pest infestation problem with the one or more items.

9. The computer system of claim 8, the method further comprising:
validating, by the one or more processors of the computer system, the recommended remediation action using cognitive analysis prior to transporting the one or more items.

10. The computer system of claim 8, wherein the identifying the presence of the pest infestation problem with one or more items in transport using cognitive analytics and information received from the at least one sensing device further comprises:

using a handheld or mobile microphone and/or camera to check for pests in the container during pickup;
receiving, by the one or more processors of the computer system, audio or video captured by the handheld or mobile microphone and/or camera;
analyzing, by the one or more processors of the computer system, the audio or video to identify pests present and a level of infestation within the container.

11. The computer system of claim 10, wherein the container includes the at least one sensing device, the method further including registering each of the container, the one or more items, and the at least one sensing device in the block chain ledger.

12. The computer system of claim 8, the method further comprising:
providing secure identification of a plurality of vehicles used for transporting the one or more items to the one or more processors of the computer system; and
auditing, by the one or more processors of the computer system, a historical status of the plurality of vehicles used for transporting the one or more items checking for prior problems; and at least one of:
validating remediation of the prior problems; and
rechecking one or more of the plurality of vehicles.

13. The computer system of claim 12, further comprising:
determining, by the one or more processors of the computer system, the appropriate method and location to validate remediation of the prior problems.

14. The computer system of claim 8, further comprising:
determining, by the one or more processors of the computer system, that the pest infestation is a particular type of pest infestation;
identifying, by the one or more processors of the computer system, actions required based on the existence of the pest infestation and the risks associated with the particular type of pest infestation and the particular type of items that comprise the one or more items.

15. A computer program product, comprising a computer readable hardware storage device storing a computer readable program code, the computer readable program code comprising an algorithm that when executed by one or more processors of a computer system implements a method, the method comprising:
identifying, by the one or more processors of the computer system, a presence of a pest infestation problem with one or more items in transport using cognitive analytics to notice patterns and draw conclusions based on detected patterns and using information received from at least one sensing device to determine that one or more conditions are met which indicate a particular pest infestation is likely to be present, wherein the identifying the presence of the pest infestation problem with one or more items in transport using cognitive analytics and information received from the at least one sensing device further comprises:
identifying, by the one or more processors of the computer system, one or more points in a supply chain for transporting the one or more items that need to be tracked;
identifying, by the one or more processors of the computer system, a container used to transport the one or more items; and
scanning, by at least one sensing device, the container at the one or more points in the supply chain to detect whether a pest infestation is found within the containers;

in response to the identifying, storing, by the one or more processors of the computer system, an identification of the presence of the pest infestation problem in a block chain ledger by a secure and validated feed having an indexed encryption identifying the sensing device; and recommending, by the one or more processors of the computer system, a remediation action to fix the pest infestation problem with the one or more items.

16. The computer program product of claim 15, the method further comprising:

validating, by the one or more processors of the computer system, the recommended remediation action using cognitive analysis prior to transporting the one or more items.

17. The computer program product of claim 15, wherein the identifying the presence of the pest infestation problem with one or more items in transport using cognitive analytics and information received from the at least one sensing device further comprises:

using a handheld or mobile microphone and/or camera to check for pests in the container during pickup;

receiving, by the one or more processors of the computer system, audio or video captured by the handheld or mobile microphone and/or camera;

analyzing, by the one or more processors of the computer system, the audio or video to identify pests present and a level of infestation within the container.

18. The computer program product of claim 17, wherein the container includes the at least one sensing device, the method further including registering each of the container, the one or more items, and the at least one sensing device in the block chain ledger.

19. The computer program product of claim 15, the method further comprising:

providing secure identification of a plurality of vehicles used for transporting the one or more items to the one or more processors of the computer system; and auditing, by the one or more processors of the computer system, a historical status of the plurality of vehicles used for transporting the one or more items checking for prior problems; and at least one of:

validating remediation of the prior problems; and rechecking one or more of the plurality of vehicles.

20. The computer program product of claim 19, further comprising:

determining, by the one or more processors of the computer system, the appropriate method and location to validate remediation of the prior problems.

* * * * *